United States Patent [19]

Kobayashi et al.

[11] Patent Number: 4,796,726
[45] Date of Patent: Jan. 10, 1989

[54] ULTRASONIC RANGEFINDER

[75] Inventors: Hiroshi Kobayashi, Yokohama; Hiroaki Obayashi, Yokosuka, both of Japan

[73] Assignee: Nissan Motor Co., Ltd., Yokohama, Japan

[21] Appl. No.: 117,807

[22] Filed: Nov. 6, 1987

Related U.S. Application Data

[62] Division of Ser. No. 737,937, May 28, 1985, Pat. No. 4,739,860.

[30] Foreign Application Priority Data

| May 29, 1984 | [JP] | Japan | 59-107559 |
| May 29, 1984 | [JP] | Japan | 59-107560 |
| May 29, 1984 | [JP] | Japan | 59-77919[U] |

[51] Int. Cl.⁴ ............... G01S 15/00; H05K 5/00; H04R 7/00
[52] U.S. Cl. ............... 181/123; 181/151; 181/139; 367/99; 367/140
[58] Field of Search ............... 181/108, 109, 110, 123, 181/124, 139, 144, 146, 147, 151, 192, DIG. 1, 208; 367/99, 106, 130, 140, 162, 165, 173, 176, 188, 910

[56] References Cited

U.S. PATENT DOCUMENTS

| 2,795,709 | 6/1957 | Camp | 367/162 |
| 3,234,501 | 1/1966 | Sicuranza | 367/191 |
| 3,427,866 | 1/1969 | Weighart | 73/610 |
| 3,512,605 | 5/1970 | McCorkle | 181/DIG. 1 |
| 4,677,595 | 6/1987 | Obayashi et al. | 367/99 X |
| 4,739,860 | 4/1988 | Kobayashi et al. | 181/123 |

FOREIGN PATENT DOCUMENTS

| 3115321 | 4/1983 | Fed. Rep. of Germany . |
| 3137745 | 7/1983 | Fed. Rep. of Germany . |
| 2189970 | 6/1972 | France | 181/199 |
| 53-21953 | 2/1978 | Japan . |
| 54-103074 | 8/1979 | Japan . |
| 56-153267 | 11/1981 | Japan . |
| 56-153268 | 11/1981 | Japan . |
| 57-68574 | 4/1982 | Japan . |
| 57-68575 | 4/1982 | Japan . |
| 57-84375 | 5/1982 | Japan . |
| 57-93271 | 6/1982 | Japan . |
| 57-175266 | 10/1982 | Japan . |
| 57-182544 | 11/1982 | Japan . |
| 57-179678 | 11/1982 | Japan . |
| 58-66079 | 4/1983 | Japan . |
| 184359 | 10/1983 | Japan . |
| 188371 | 10/1983 | Japan . |
| 58-182571 | 2/1984 | Japan . |
| 58-189573 | 2/1984 | Japan . |
| 59-106084 | 7/1984 | Japan . |
| 59-145666 | 8/1984 | Japan . |
| 60-189873 | 12/1985 | Japan . |
| 60-189876 | 12/1985 | Japan . |
| 1553933 | 10/1979 | United Kingdom . |
| 2086183 | 5/1982 | United Kingdom . |

Primary Examiner—Brian S. Steinberger
Attorney, Agent, or Firm—Foley & Lardner Schwartz, Jeffery Schwaab, Mack Blumenthal & Evans

[57] ABSTRACT

An ultrasonic rangefinder capable of detecting a distance between a vehicle and an object with high accuracy is shown. The measure of microphones for transmitting and receiving ultrasonic waves is chosen so that detour waves are restricted.

1 Claim, 10 Drawing Sheets

HORN APERTURE DIAMETER y (mm)

ULTRASONIC RANGEFINDER

This application is a division of application Ser. No. 737,937, filed May 28, 1985 now U.S. Pat. No. 4,739,860.

BACKGROUND OF THE INVENTION

The present invention relates to an ultrasonic rangefinder which is used to transmit and receive an ultrasonic wave signal for the detection of the distance from an object and, in particular, to improvements of an ultrasonic rangefinder for preventing a detour wave from reducing the accuracy of the detection.

There are already several ultrasonic rangefinders in existence, for example the one described in Utility Model Published Application No. Sho 57-68574. Such a device emits ultrasonic wave from an ultrasonic wave transmitter and receives pulses reflected from an object by an ultrasonic wave receiver. The distance is found from the phase difference between the emitted pulse and the received pulse.

As technically discussed in the art, received waves on a receiver include a detour wave which reduce the accuracy of detection. In a rangefinder, particularly in a rangefinder which detects the vehicle hight (the distance from the undersurface of the body of the vehicle to the ground), as disclosed in Japanese Patent Published Application No. Sho 57-182544, the reflected wave and the detour wave partially overlap, because the detected distance is short, (15 to 40 cm).

In a case of this type, the overlapping portions mutually interfere, causing the signal level to vary. In addition, when using the rangefinder on snow-covered roads and sandy soil, giving full consideration to the fact that the reflected wave signal is diminished because the ultrasonic wave signal is absorbed, there is a great necessity to set a low threshold level, and for this reason it is especially easy to produce the abovementioned error.

It has been proposed, as shown in Japanese Patent Published Application No. Sho 53-21953, to provide horns on a wave transmitter and a wave receiver for improving the directionality of the wave transmitter and receiver.

However, even with the improvement in directionality provided by the horns in such an ultrasonic rangefinder, when an ultrasonic transmitter and an ultrasonic receiver are installed in close proximity, a detour wave of an appreciable level which is directly incident from the wave transmitter and not reflected from the target object, is received in addition to a reflected wave.

This detour wave especially when an object at a short distance is being detected (such as in the case of gauging the height of an automobile, as previously mentioned) partially overlaps the reflected wave and creates an obstruction, and is apt to cause a detection error by mixing with the reflected wave.

Furthermore, in a low temperature ambience the type of insulators normally used for damping the detour wave which transmits machanically from the transmitter to the receiver inside the rangefinder suffer a decrease in elasticity, and because their noise prevention effectiveness deteriortes, the level of the detour wave becomes higher than when at normal temperatures.

SUMMARY OF THE INVENTION

An object of the present invention is to provide, with due consideration to the drawbacks of such conventional devices, an ultrasonic rangefinder in which the detour wave is effectively damped.

Further object of the present invention is to improve the detection performance of an ultrasonic rangefinder by effectively damping the detour wave through an improvement in the shape or positions of transmitting and/or receiving port of the rangefinder.

A still further object of the present invention is to provide an ultrasonic rangefinder which can prevent the effect of the detour wave even in a low temperature ambience.

BRIEF DESCRIPTION OF THE DRAWINGS

These and other objects, features and advantages of the present invention will become more apparent from the following description of preferred embodiments taken in conjunction with the accompanying drawings, in which.

DESCRIPTION OF THE PREFERRED EMBODIMENTS

To facilitate the understanding of the present invention, the conventional ultrasonic rangefinder will be briefly discussed.

Figure 1:
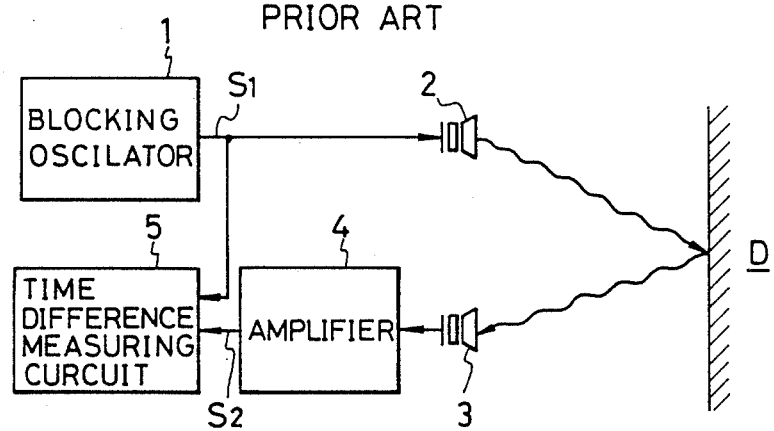
FIG. 1 is a block diagram showing an example of the electrical configuration of an ultrasonic rangefinder.

The configuration of the electrical components of such an ultrasonic rangefinder is shown in FIG. 1.

A blocking oscillator 1, as shown in FIG. 1, generates a high frequency signal $S_1$ for a specified time interval $t_1$, every period $t_2$, and suplies an ultrasonic wave transmitting means 2. As a result, an ultrasonic wave pulse signal from the ultrasonic wave transmitting means 2 is transmitted toward a target object D.

Then, the ultrasonic wave pulse signal relfected from the target object D enters an ultrasonic wave receiving means 3, upon which the received signal is amplified in an amplifier 4, then the amplified signal $S_2$ is input into a time difference measuring curcuit 5.

Figure 2:
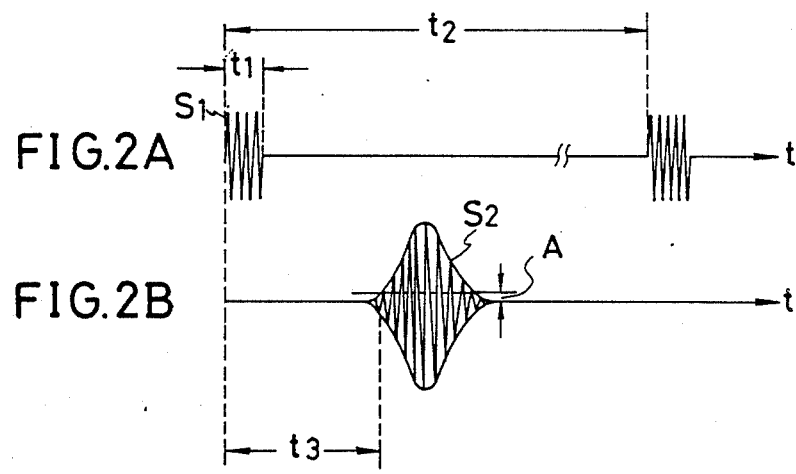
FIG. 2A and FIG. 2B are waveform diagrams showing transmitted and received signals of a conventional rangefinder.

This time difference measuring circuit 5 determines the time interval $t_3$ (shown in FIG. 2B) from the starting point of the high frequency wave signal $S_1$ output from the blocking oscillator 1, to the starting point of the previously mentioned received signal $S_2$ after amplification, and treats this as data giving the distance to the target object.

The starting point of the received signal $S_2$ is set as the point where the level of the received signal $S_2$ exceeds a specified threshold level A.

Figure 3:
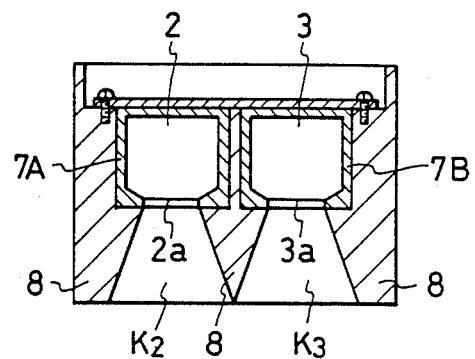
FIG. 3 is a sectional view showing the inside of a conventional ultrasonic rangefinder.

The ultrasonic wave transmitting means 2 and the ultrasonic wave receiving means 3, as shown in FIG. 3, are housed in a common casing 8.

The casing 8 is formed from a plastic such as a synthetic resin. As well as housing the ultrasonic wave transmitting means 2 and the receiving means 3, this casing 8 is formed to provide a transmitting port $K_2$ and a receiving port $K_3$, both of which are horn-shaped, and which lead to a transmitting surface 2a and a receiving surface 3a, respectively.

The detour wave includes a wave which transmits sonically inside the rangefinder from the transmitting means 2 to the receiving means 3 as well as a wave which propagates and is detoured through the air from the transmitting part $K_2$ to the receiving port $K_3$.

A plurality of insulators 7A and 7B, made from rubber or some such elastic material, are interposed between the casing 8 and the transmitting and receiving means 2 and 3 for prevention transmitting signals from entering the receiving means inside the casing 8.

Figure 4A:
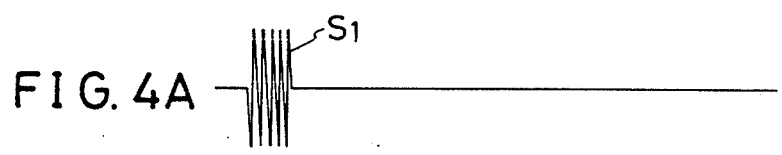
FIG. 4A and FIG. 4B are waveform diagrams showing a transmitting wave and the generated status of the detour wave.
Figure 4B:
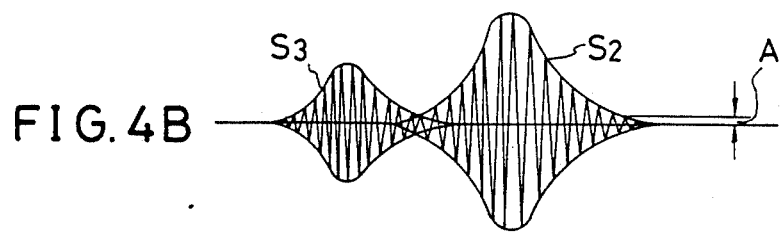

As shown in FIG. 3, when the ultrasonic wave transmiting means 2 and the ultrasonic wave receiving means 3, are in close proximity and are housed in the casing 8, as shown in FIG. 4B, the vibrations from the wave transmitting means are transmitted into the casing 8 as the signal received in the receiving means 3 in addition to the reflected wave signal $S_2$ from the target object D, and the reception level of the detour wave $S_3$ arriving at the wave receiving means 3 cannot be ignored.

In particular, the reflected wave $S_2$ and the detour wave $S_3$ partially overlap in equipment to detect the vehicle height (the distance from the undersurface of the body of the vehicle to the ground), because the detected distance is short, (15 to 40 cm).

In a case of this type, the overlapping portions mutually interfere, causing the signal level to vary.

Furthermore, the pulse width $t_3$ of the detour wave $S_3$ is distorted according to the route by which it reached the wave receiving means 3 from the transmissing means 2.

Figure 5A:
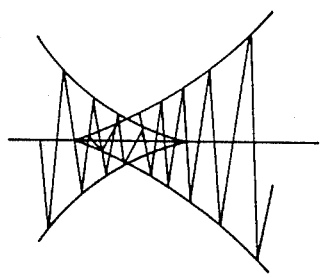
FIGS. 5A to 5C and FIGS. 6A to 6C are waveform diagrams showing the waveforms of the detour wave and reflected waves when they overlap, and the time difference change.
Figure 5B:
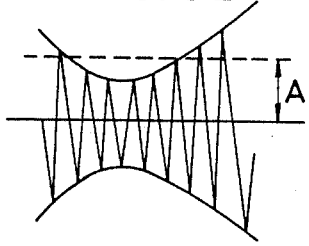
Figure 5C:
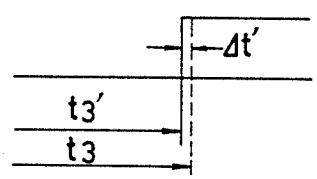

Specifically, in the case where the detour wave $S_3$ and the reflected wave $S_2$ are received in the same phase (shown in FIG. 5A), the levels of their component waves are added, as shown in FIG. 5B, and the starting point of the reflected wave $S_2$ (the point where the threshold level A is exceeded) advances (by $\Delta t'$ as shown in FIG. 5C).

Figure 6A:
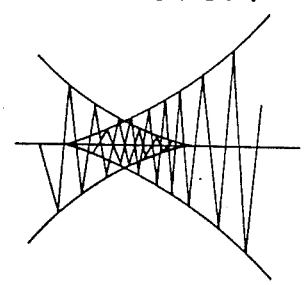
Figure 6B:
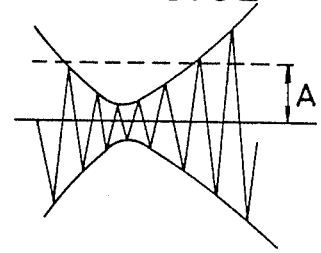
Figure 6C:
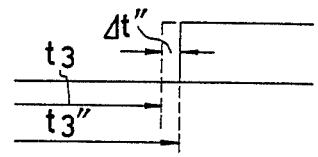

When the signals are received as opposite phases (shown in FIG. 6A), the levels of their component waves are subtracted, as shown in FIG. 6B, and the starting point of the reflected wave $S_2$ is retarded (by $\Delta t''$ as shown in FIG. 6C).

Accordingly, at this sort of a starting position for the reflected wave $S_2$, there is an overlapping, and, as shown in FIG. 5C and FIG. 6F, an error range is produced for t' or t'' in the time difference $t_3$, and the accuracy of detection diminishes.

Hereinafter some embodiments of the present invention will be described with the accompanied drawings in which same references are given for same parts as in FIGS. 1 and 3.

Figure 7:
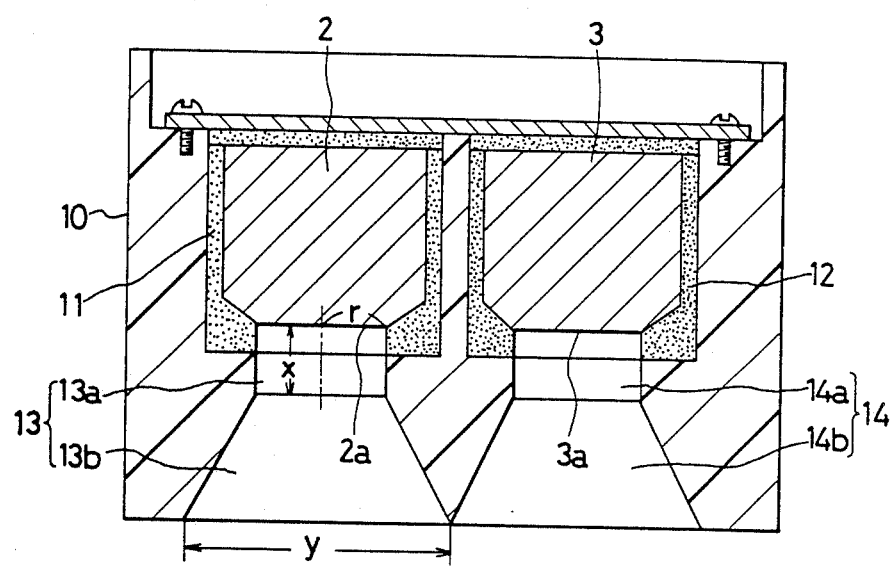
FIG. 7 is a sectional view showing the configuration of a first embodiment of the present invention.

A first embodiment of the present invention is shown in FIG. 7. Referring to the figure, ultrasonic wave transmitting means 2 and an ultrasonic wave transmitting means 3 are housed side by side in a housing chamber of a casing 10, which is formed of a synthetic resin such as a plastic.

A plurality of insulators 11 and 12, which are made from a material which effectively insulates sound, such as a flexible rubber, is interposed between the casing 10 and the transmitting and receiving means 2 and 3, with the exception of a transmitting surface 2a and a receiving surface 3a.

In the bottom surface of the casing 10 are provided a plurality of horns 13 and 13 which are formed as orifices communicating with the transmitting surface 2a and the receiving surface 3a respectively.

The horns 13 and 14 comprise straight tubular sections 13a and 14a, formed in a cylindrical shape pointing in a downward direction from the peripheries of the transmitting surface 2a and the receiving surface 3a respectively, and conical sections 13b and 14b, formed in a cone shape, opening in the downward direction from the bottom edges of the straight tubular sections 13a and 14a toward the bottom surface of the casing 10.

The length x of the straight tubular sections 13a and 14a is set to satisfy the relationship.

$$x = 1.5\, r^2/\lambda \tag{1}$$

where r is the radius of the transmitting and receiving surfaces 2a and 3a, and $\lambda$ is the wave length of the ultrasonic signal produced by the wave transmitting means 3.

Also, the aperture diameter y of the horns 13, 14 is set to that $$y = 2\lambda \tag{2}$$

By shaping the horns 13, 14 so that they satisfy the relationships shown in the above equation (1) and (2), the detour wave is considerably damped, and it is possible to avoid its effect.

The results of tests performed by the inventors of the present invention to derive the above equations (1) and (2) are given below.

The wave transmitting and receiving means 2, 3 used in these tests have a center frequency of 40 KHz (wave length $\lambda = 8.5$ mm), and the radius r of the transmitting and receiving surfaces 2a, 3a is 5.4 mm. (N.B. Because the normal oscillation mode of the transmitting and receiving means is bending mode, here the effective radius of the vibrating surfaces is considered to be 5.0 mm).

Figure 8:
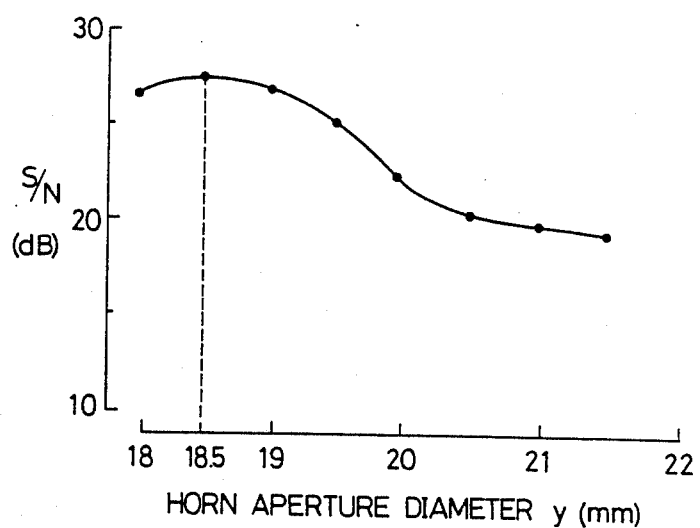
FIG. 8 is a graph showing the relationship between the horn aperture diameter and S/N of an ultrasonic rangefinder, obtained by actual test.

The test results shown in FIG. 8 give the variation in S/N for variations in the aperture diameter y of the horns 13, 14 (where S/N is the comparative strength of the reflected wave and the detour wave with an aluminum plate placed 30 cm away from the aperture surface).

From the same drawing it can be determined that S/N is a maximum when the aperture diameter y is 18.5 mm (which is about double the wave length $\lambda$).

Figure 9:
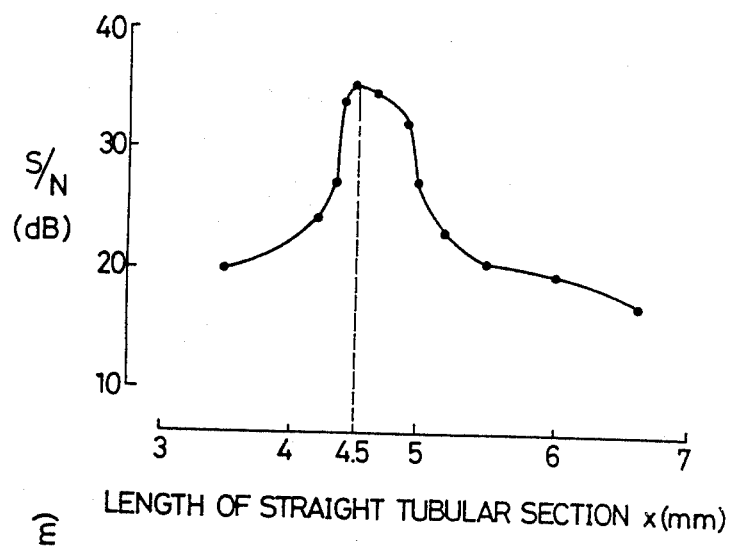
FIG. 9 is a graph showing the relationship between the length of the straight tubular section of the horn and S/N, obtained by actual test.

The test results shown in FIG. 9 give the S/N ratio for different values of x, the length of the straight tubular section, with the horns 13, 14 having an aperture diameter of 18.5 mm, which is determined to be the optimum diameter from the test results of FIG. 8.

From the same drawing it can be determined that S/N is a maximum when the length of the straight tubular section x is approximately 4.5 mm.

Next, considering the radius r of the transmitting and receiving surfaces and the wave length of the ultrasonic wave signal as parameters related to the optimum value of the length x of the straight tubular section, the following expression is obtained.

$$x = f(r, \lambda) \qquad (3)$$

Figure 10:
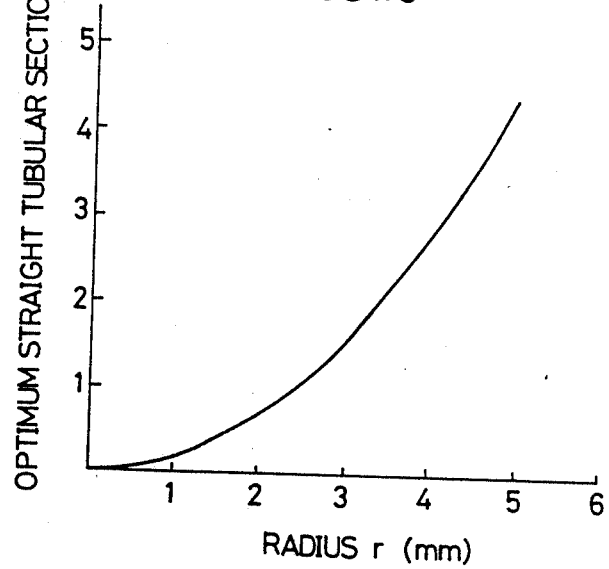
FIG. 10 is a graph showing the relationship between the radius of the wave transmitting/receiving surface and the optimum length of the straight tubular section, obtained by actual test.

The test results shown in FIG. 10 give the length x of the straight tubular section with S/N at a maximum (which is the optimum straight tubular section length) when the radius r of the transmitting and receiving surfaces is varied with the wave length $\lambda$ at a fixed value (8.5 mm).

Figure 11:
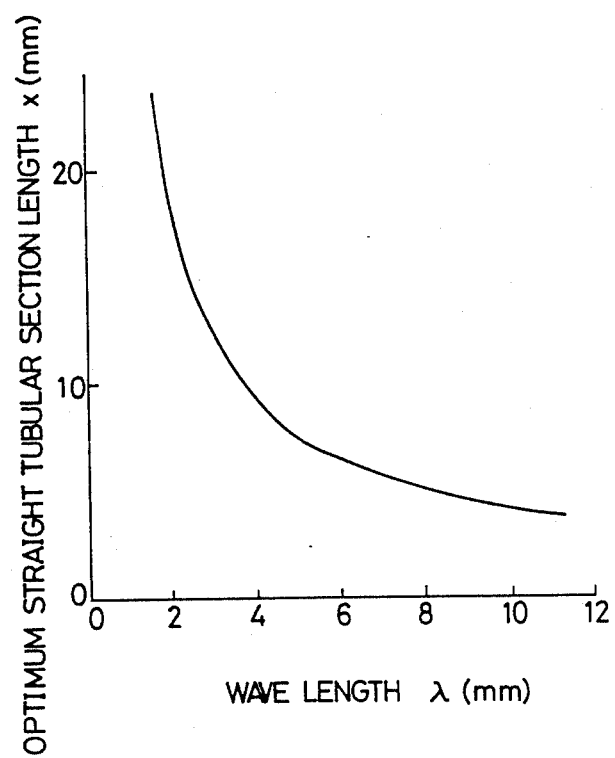
FIG. 11 is a graph showing the results of actual tests to determine the relationship between the wave length of the ultrasonic wave signal and the optimum length of the straight tubular section.

The test results shown in FIG. 11 give the length x of the straight tubular section when the wave length $\lambda$ is varied while holding the radius r at a fixed value (5 mm).

From these two drawings it can be determined that the optimum length x of the straight tubular section is proportional to the square of the radius and is inversely proportional to the wave length $\lambda$.

Accordingly, equation (3) may be expressed as $$x = k \cdot r^2 / \lambda \qquad (4)$$

(where k is a constant).

Here, if the optimum length of the straight tubular section, determined from the test results shown in FIG. 9 as $x = 4.5$ mm, and $\lambda = 8.5$ (mm), $r = 5$ (mm) are substituted in equation (4), the value of the constant k is calculated as $k = 1.5$ and the equation (1) are derived.

Similarly, the optimum value of the length x of the straight tubular sections 13a, 14a can be obtained from equation (1) for diverse values of $\lambda$ and r.

Figure 12:
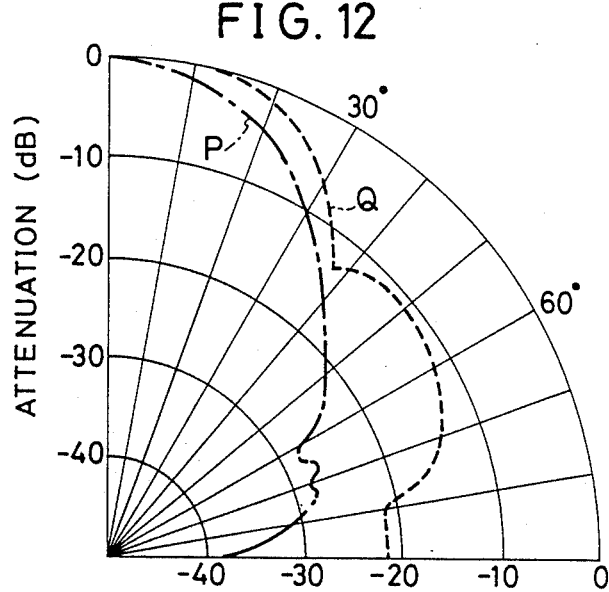
FIG. 12 is a diagram of the directional characteristics of the wave transmitting means of the first embodiment of the present invention.
Figure 13:
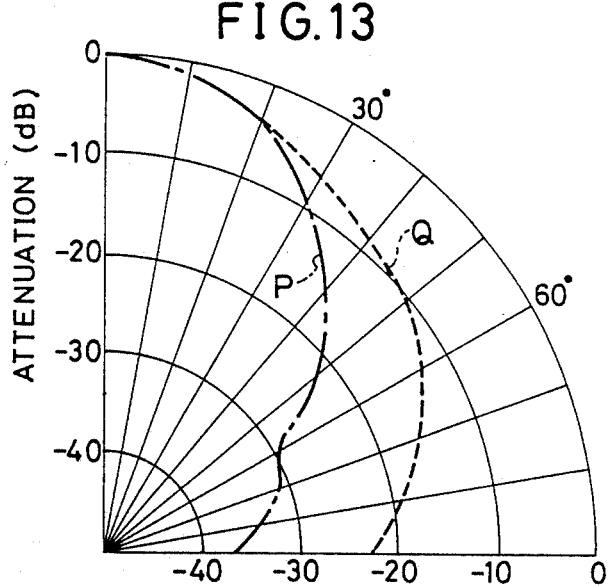
FIG. 13 is a diagram of the directional characteristics of the wave receiving means of the first embodiment of the present invention.

The results of the tests on the damping of the detour wave, provided by the shape of the horns, are shown in FIG. 12 and FIG. 13. FIG. 12 shows the directional characteristics of the wave transmitting means 2, while FIG. 13 shows the directional characteristics of the wave receiving means 3. In the diagram, P indicates the characteristics of the present invention, and Q indicates the characteristics of a means not using the horns.

From these two diagrams, in the case of this embodiment of the present invention, the amount of damping from the means with the horns is large in a lateral side. Specifically it is determined that adequate damping of the detour wave is carried out.

Further, in this embodiment, the provison of the insulators 11, 12 results in the noise eliminating effect. Also, by housing the wave trasmitting and receiving means 2, 3, the positioning error as a result of the elasticity of the insulators 11. 12 is controlled by the casing.

Further, in the present invention, as shown in FIG. 7, the wave transmitting and receiving means 2, 3 can obviously be applied for a rangefinder having separate casings side by side.

As has been explained in detail above, in the present invention, the detour wave can be extensively damped by improving the shape of the horn, and the creation of an obstacle to the detection of the reflected wave can be prevented.

In addition, the high efficiency of the horn in damping the detour wave makes it possible to install the wave transmitting and receiving means in close proximity, so that the ultrasonic rangefinder itself can be reduced in size.

Figure 14:
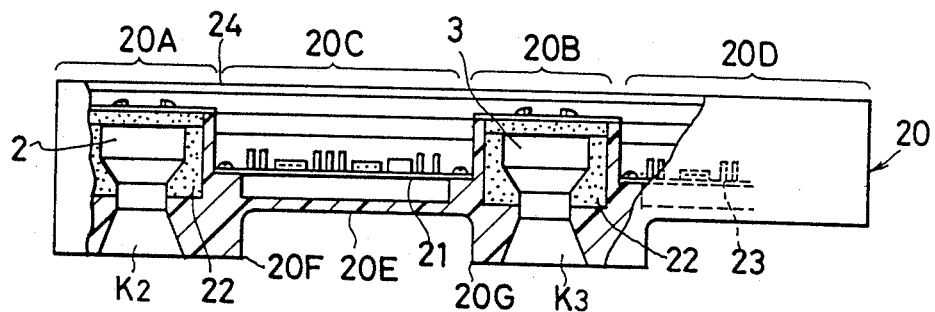
FIG. 14 is a sectional view showing the configuration of a second embodiment of the present invention.
Figure 15:
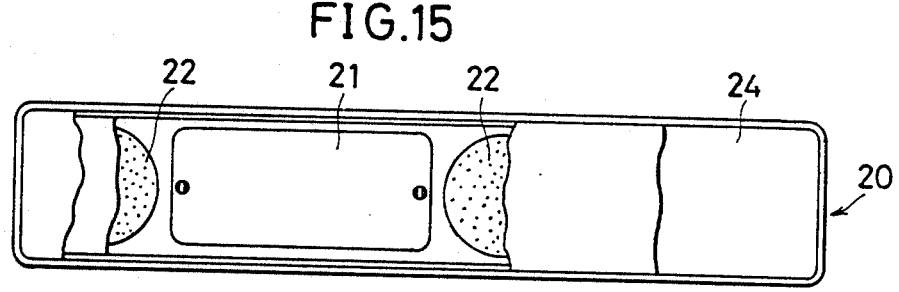
FIG. 15 is a plan view showing the upper surface of the second embodiment of the present invention.

FIG. 14 and FIG. 15 show a second embodiment of the present invention. A casing 20, formed from synthetic resin such as a plastic, comprises a wave transmitting means housing section 20A which houses a wave transmission means 2, a wave receiving means housing section 20B which houses a wave receiving means 3, a connecting section 20C which connects the housing sections 20a and 20B, and a circuit housing section 20D.

A signal transmitting port $K_2$, which transmits an ultrasonic signal produced by the wave transmitting means 2, is formed in the wave transmitting means housing section 20A, and a signal receiving port $K_3$, which introduces the ultrasonic signal of the reflected wave, is formed in the wave receiving means housing section 20B. The aperture surfaces of the signal transmitting port $K_2$ and the signal receiving port $K_3$ are positioned at the same height.

A signal-processing circuit 21 is housed in the connecting section 20C. In addition, a concave section 20E is provided which is formed so that its surface is more concave than the aperture surfaces of either the signal transmitting port $K_2$ or the signal receiving port $K_3$. The bottom surface and wall surfaces of the concave section 20E are formed roughly at right angles.

A signal-processing circuit 23 is housed in the signal housing section 20D. In addition, the entire upper surface of the casing 20 is covered with a lid 24, and around its circumference this lid 24 is sealed to the circumferential edge of the casing 20.

A rubber or synthetic plastic insulator 22 is interposed between the side circumference and top surfaces of both the wave transmitting means 2 and the receiving means 3.

FIG. 15 is a plan view showing the second embodiment of the present invention.

As a result of this type of configuration, in this embodiment of the present invention, through the separation of the signal transmitting port K₂ and the signal receiving port K₃ by the connecting section 20C, together with the utilization of the concave section 20E, damping of the detour wave is achieved and it is possible to prevent the detour wave from entering the receiving means 3.

The reason that the concave section 20E damps the detour wave is because damping occurs in a plurality of angular sections 20F and 20G, which are formed at the bottom edge of the wall surface of the concave section 20E, as a result of the dispersion of the detour wave. The damping which results from this dispersion is large, and first occurs at the angular section 20F of the signal transmitting port K₂, then at the angular section 20G of the signal receiving port K₃.

A damping effect is also produced by the interference which occurs when the detour wave enters the concave section 20E.

Figure 16:
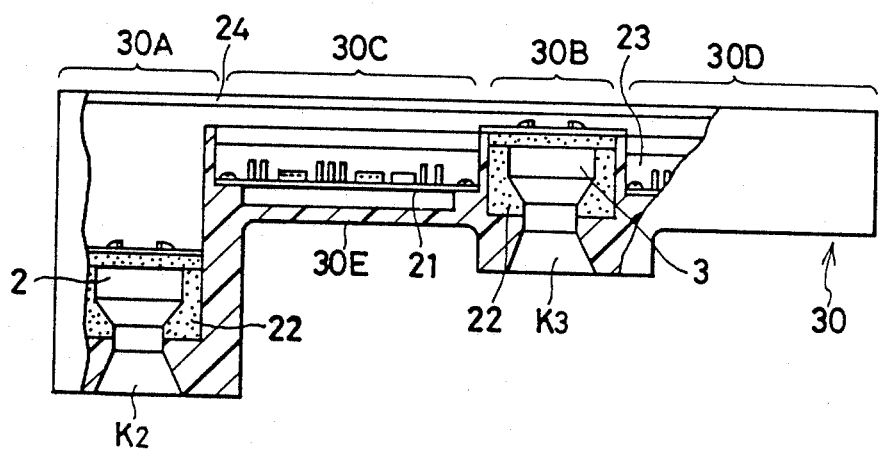
FIG. 16 is a sectional view showing the configuration of a third embodiment of the present invention.

Next, a third embodiment of the present invention is shown in FIG. 16. In the same way as in the second embodiment, a casing 30 is provided with a connecting section 30C, a wave receiving means housing section 30B, and a circuit housing section 30D, in addition to a wave transmitting means housing section 30A, formed as the signal transmitting port K₂, which has a aperture surface at a different height than the signal receiving port K₃.

A concave section 30E is formed at the bottom surface of the connecting section 30C in the same way as in the second embodiment.

As a result of this type of configuration, in this embodiment of the present invention, the same effect is obtained as for the second embodiment. In addition, as a result of the heights of the signal transmitting port K₂ and the signal receiving port K₃ being different, it is possible to prevent the detour wave from entering the receiving means 3 through diffraction, and is possible to obtain an even greater damping of the detour wave.

In this case, it is desirable to position the aperture surface of the signal receiving port K₃ behind the aperture surfce of the signal transmitting port K₂ (above, in the drawing). It is also acceptable to eliminate the concave section 30E shown in FIG. 16, and position the bottom surface of the connecting section 30C at the same height as the aperture surface of the signal receiving port K₃. Alternately, the bottom surface of the connecting section 30C may be positioned at a height midway between the aperture surface of the signal transmitting port K₂ and the aperture surface of the signal receiving port K₃.

As outlined in the foregoing detailed explanation, in the first, second and third embodiments of the present invention it is possible to damp the detour signal which is produced by the ultrasonic wave signal generated from the wave transmitting means, passing through space to enter the receivng means, and to prevent the detour signal from received in the receiving means, so that an accurate detection action may be carried out.

Figure 17:
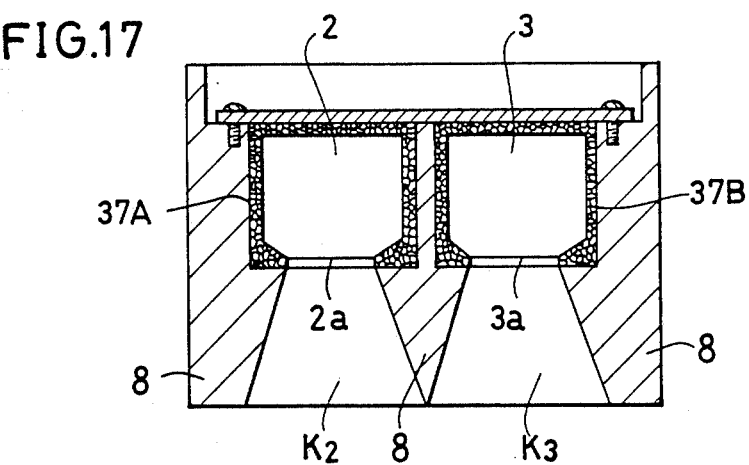
FIG. 17 is a sectional view showing the configuration of a fourth embodiment of the present invention.

Reffering now to FIG. 17 a fourth embodiment of the present invention is shown.

This embodiment has been conceived for damping vibrations which are transmitted sonically from a transmittaing means to a receiving means through an inside of the device.

In the ultrasonic rangefinder of this embodiment of the present invention, a plurality of insulators 37 and 37 cover the vibrating surfaces of an ultrasonic wave transmitting means 2 and an ultrasonic wave receiving means 3 other than a wave transmitting surface 2a and a wave receiving surface 2b. These insulators 37 and 37 are interposed between a casing 8 and the ultrasonic wave transmitting and receiving means 2 and 3.

The material of which the insulators 37 and 37 are constructed is a foamed elastic body formed of independent air bubbles on a substrate of an ethylene-propylene rubber such as ethylene-propylene terpolymer (EPDM) or thylene-propylene copolymer (EPM).

Figure 18:
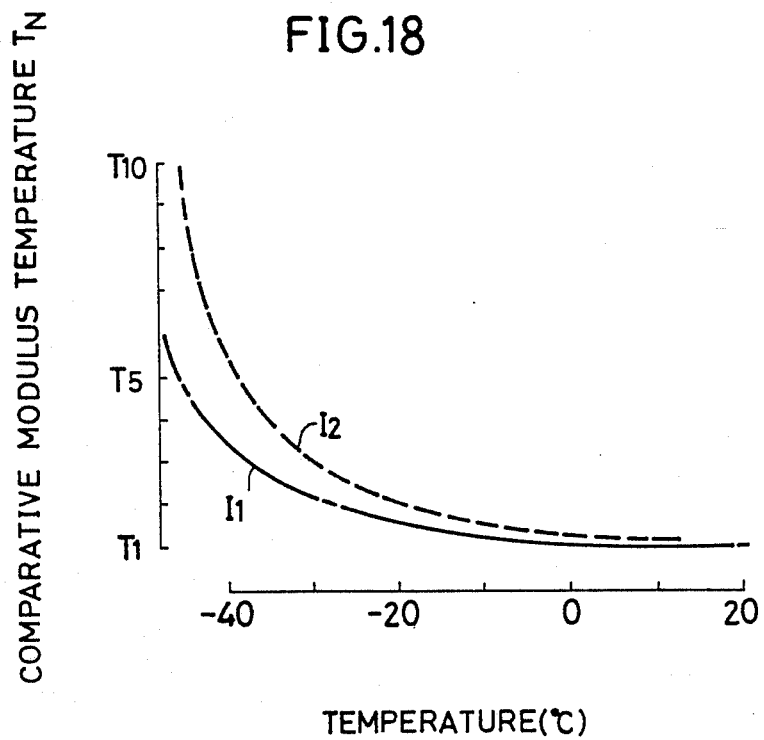
FIG. 18 is a characteristic diagram for the fourth embodiment of the present invention, showing the change in rigidity versus temperature for insulators housing transmitting and receiving means.

The insulators 37A and 37B made of this kind of material, as shown in FIG. 18, exhibit a smaller change in hardness with change in temperature than insulators formed of an unfoamed ethylene-propylene rubber. Even at low temperatures they do not lose their noise prevention effectiveness. In FIG. 18, the characteristics of the insulators 37A and 37B of the present invention are shown as $I_1$, while the characteristics of insulators made of unformed ethylene-propylene rubber are shown as $I_2$. The comparative modulus temperature TN is a temperature at which the rigidity becomes the N multiple.

Figure 19:
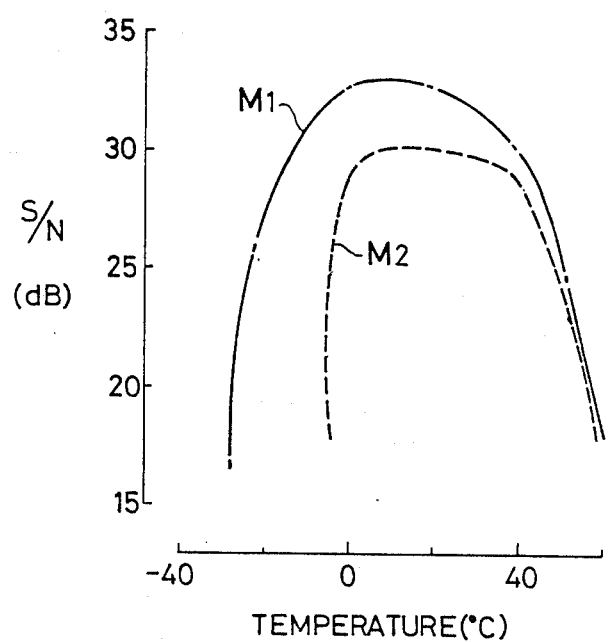
FIG. 19 is a characteristic diagram for the fourth embodiment of the present invention showing the effect of damping on the detour wave versus change in temperature.

FIG. 19 is a graph showing the relationship between the temperature and S/N, the ratio of the peak level of the reflected wave $S_2$ to the peak level of the detour wave $S_3$. The characteristics of this embodiment of the present invention are designated $M_1$ and those of the conventional means shown in FIG. 3, $M_2$.

From this graph it can be concluded that the damping effect of detour wave in this embodiment is large, and at low temperatures, as well, this effect is not diminished.

Accordingly, in this embodiment of the present invention a good damping effect on the detour wave $S_3$ can be obtained, and the reflected wave $S_2$ is always detected with good accuracy over a wide temperature range ($-30°$ to $+80°$ C.).

In addition, the abovementioned ethylene-propylene rubber shows good resistance to weather and to chemicals, and is suitable for automobile parts.

The foamed elastic body used for the insulators 37A and 37B, because of its independent air bubble structure, does not become soaked with water by permeation when used in an environment where it is exposed to rainwater, unlike a continuously foamed material, and thus low performance because of freezing is prevented.

The foaming ratio of the insulators 37A and 37B is chosen at a rather higher value, about 20%, than foaming materials which are broadly used. In addition by use of an agent having small cold hardening it is possible to reduce still more the hardening of the insulators at low temperatures.

Figure 20:
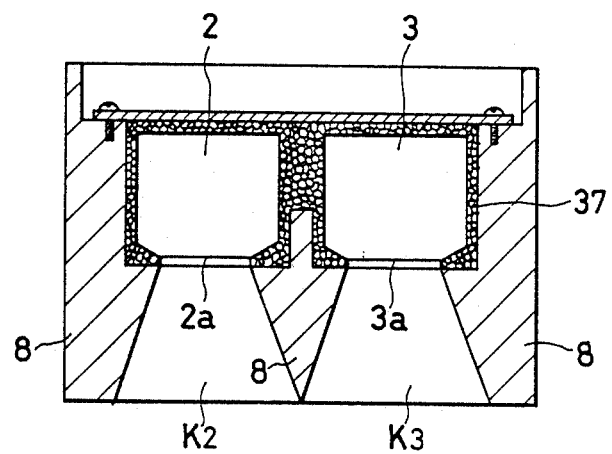
FIG. 20 is a sectional view showing the configuration of a fifth embodiment of the present invention.

A fifth embodiment of the present invention, shown in FIG. 20, will now be explained.

In this embodiment, an insulator 37, which covers the ultrasonic wave transmitting and receiving means 3 and 2 are formed as one integral unit.

The material of construction of this insulator 37 is identical to that used in the fourth embodiment of the present invention shown in FIG. 17.

By this type of construction, the same effect is obtained as with the fourth embodiment, and, in addition, it is possible to reduce the assembly process and eliminate the positioning variance of the transmitting means 2 and receiving means 3.

In both fourth and fifth embodiments of the present invention ethylene-propylene rubber is used as the substrate for the insulators, but other materials having a noise deadening effect, such as urethane rubber, are also suitable for this application.

Herein before, several embodiments are described which show several structural features. Any structural feature of one embodiment can be applied for another embodiment so that the combination take a more effective configuration against an obstraction due to detour waves.

It should be understood, of course, that the foregoing relates only to preferred embodiments of the present invention and that numerous modifications or alterations may be made therein without departing from the spirit and scope of the invention as set forth in the appended claims.

What is claimed is:

1. An ultrasonic rangefinder for measuring the distance between the rangefinder and an object, said rangefinder comprising:

means for transmitting an ultrasonic wave toward the object and having a transmitting surface;

means for receiving an ultrasonic wave reflected from the object and having a receiving surface;

a casing having two cavities for housing said transmitting and receiving means, respectively, and provided with a signal-processing unit for processing signals supplied from the transmitting and receiving means to measure the distance between the rangefinder and the object, said signal-processing unit being disposed in a concave portion formed in a connecting section between the transmitting and receiving means; and a foaming insulator having an independent cell structure and covering the interior walls of at least one of said cavities whereby ultrasonic waves from the transmitting means are prevented from directly propagating to the receiving means through the interior of the casing.

* * * * *